(12) United States Patent
Chang

(10) Patent No.: US 7,845,810 B2
(45) Date of Patent: *Dec. 7, 2010

(54) PRISM SHEET AND LIQUID CRYSTAL DISPLAY DEVICE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/946,860

(22) Filed: Nov. 29, 2007

(65) Prior Publication Data

US 2009/0040421 A1    Feb. 12, 2009

(30) Foreign Application Priority Data

Aug. 7, 2007  (CN) .................. 2007 1 0201295

(51) Int. Cl.
*G09F 13/04* (2006.01)
*G09F 13/08* (2006.01)

(52) U.S. Cl. .................. 362/97.2; 362/620; 362/626

(58) Field of Classification Search ............... 362/97, 362/330, 620, 626, 97.1–97.4; 359/619; 349/61–63, 66
See application file for complete search history.

(56) References Cited

U.S. PATENT DOCUMENTS 6,752,505 B2 *   6/2004   Parker et al. ................. 362/627

FOREIGN PATENT DOCUMENTS

CN            1710478 A       12/2005

* cited by examiner

*Primary Examiner*—Jason Moon Han
(74) *Attorney, Agent, or Firm*—Frank R. Niranjan

(57) ABSTRACT

An exemplary prism sheet includes a light input surface, a light output surface opposite to the light input surface, and a plurality of micro-protrusions formed on the light output surface and arranged in a skewed matrix. Each micro-protrusion includes at least three side surfaces connected in turn. A transverse width of each side surface decreases along a direction away from the light output surface. A liquid crystal display device using the prism sheet can efficiently decrease moiré patterns between the prism sheet and the liquid crystal display panel.

13 Claims, 8 Drawing Sheets

PRISM SHEET AND LIQUID CRYSTAL DISPLAY DEVICE USING THE SAME

CROSS-REFERENCE TO RELATED APPLICATIONS

This application is related to three co-pending U.S. patent applications, which are: application Ser. No. 11/933,439 and Ser. No. 11/933,431, filed on Nov. 1, 2007, and both entitled "PRISM SHEET AND LIQUID CRYSTAL DISPLAY DEVICE USING THE SAME", and application Ser. No. 11/946,862, filed on Nov. 29, 2007, and entitled "PRISM SHEET AND LIQUID CRYSTAL DISPLAY DEVICE USING THE SAME". In all these co-pending applications, the inventor is Shao-Han Chang. All of the co-pending applications have the same assignee as the present application.

BACKGROUND OF THE INVENTION

1. Field of the Invention

The present invention generally relates to prism sheets, and particularly, to a prism sheet used in a liquid crystal display (LCD).

2. Discussion of the Related Art

The weight and thinness of liquid crystal display panels make them suitable for a wide variety of uses in electronic devices such as personal digital assistants (PDAs), mobile phones, portable personal computers, and other electronic appliances. Liquid crystal is a substance that does not illuminate light by itself. Instead, the liquid crystal relies on light received from a light source to display information. In a typical liquid crystal display device, a backlight module powered by electricity supplies the needed light.

FIG. 7 is an exploded, side cross-sectional view of a typical liquid crystal display device 100 employing a typical prism sheet 10. The liquid crystal display device 100 includes a housing 11 and a plurality of lamps 12 positioned in the housing 11. The liquid crystal display device 100 further includes a light diffusion plate 13, a prism sheet 10, and a liquid crystal display panel 15 stacked on the housing 11 in that order. The lamps 12 emit light, and the inside walls of the housing 11 are configured for reflecting some of the light upwards. The light diffusion plate 13 includes a plurality of embedded dispersion particles. The dispersion particles are configured for scattering received light, and thereby enhancing the uniformity of light that exits the light diffusion plate 13. Also referring to FIG. 8, the prism sheet 10 includes a base layer 101 and a prism layer 102 formed on the base layer 101. The prism layer 102 has a plurality of V-shaped structures 103. The V-shaped structures 103 are configured for collimating, to a certain extent, the received light.

In use, unscattered light from the lamps 12 enters the diffusion plate 13 and becomes scattered. The scattered light leaves the diffusion plate 13 to the prism sheet 10. The scattered light then travels through the prism sheet 10 and is refracted out at the V-shaped structures 103 of the prism sheet 10. Thus, the refracted light leaving the prism sheet 10 is concentrated at the prism layer 102 and increases the brightness (illumination) of the prism sheet 10. The refracted light then propagates into a liquid crystal display panel (not shown) disposed above the prism sheet 10.

However, a typical method of manufacturing the prism sheet 10 includes the following steps: first, a melted ultraviolet(UV)-cured transparent resin is coated on the base layer 101 to form V-shaped lenses, then the melted ultraviolet-cured transparent resin is solidified to form the V-shaped structures 103. This results in that the V-shaped structures 103 of the prism layer 102 are usually damaged or scratched due to their poor rigidity and mechanical strength.

In addition, the V-shaped structures 103 are generally regularly arranged and extend along a direction parallel to one edge of the prism sheet 10. The V-shaped structures 103 are prone to be aligned similarly to pixels of the liquid crystal display panel 15, consequently, moiré patterns may occur between the prism sheet 10 and the pixel pitch of the liquid crystal display panel 15. In order to reduce or eliminate the moiré patterns and protect the V-shaped structures 103 of the prism sheet 10, the liquid crystal display device 100 should further include an upper light diffusion film 14 on the prism sheet 10. However, although the upper light diffusion film 14 and the prism sheet 10 are in contact with each other, a plurality of air pockets still exist at the boundary between the light diffusion film 14 and the prism sheet 10. When the liquid crystal display device 100 is in use, light passes through the air pockets, and some of the light undergoes total reflection at one or another of the corresponding boundaries. In addition, the upper light diffusion film 14 may absorb an amount of the light from the prism sheet 10. As a result, a brightness of light illumination of the liquid crystal display device 100 is reduced.

Therefore, a new prism sheet is desired in order to overcome the above-described shortcomings.

SUMMARY

A prism sheet according to a preferred embodiment includes a light input surface, a light output surface opposite to the light input surface, and a plurality of micro-protrusions formed on the light output surface and arranged in a skewed matrix. Each micro-protrusion includes at least three side surfaces connected to each other. A transverse width of each side surface decreases along a direction away from the light output surface.

A liquid crystal display device includes one or more light source, a light diffusion plate, a prism sheet described in the previous paragraph, and a liquid crystal display panel. The light diffusion plate is positioned above the light source. The prism sheet is positioned above the light diffusion plate. The liquid crystal display panel is positioned above the prism sheet.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating principles of the present prism sheet. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present prism sheet, in detail.

Figure 1:
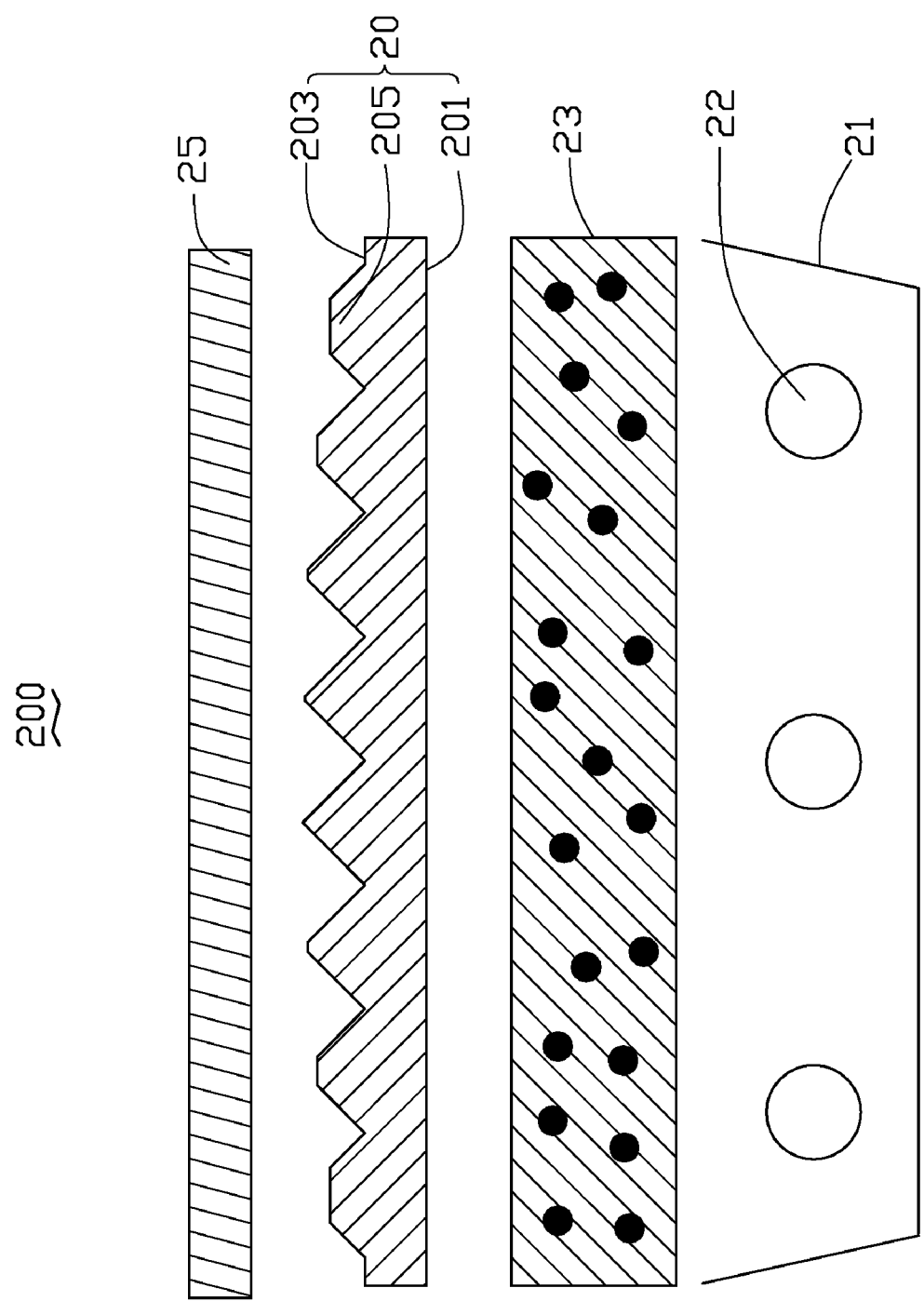
FIG. 1 is an exploded, side cross-sectional view of a liquid crystal display device in accordance with a first embodiment of the present invention.

Referring to FIG. 1, a liquid crystal display device 200 of the present invention is shown. The liquid crystal display device 200 includes a housing 21 and a plurality of lamps 22 positioned in the housing 21. The liquid crystal display device 200 further includes a light diffusion plate 23, a prism sheet 20, and a liquid crystal display panel 25 stacked on the housing 21 in that order.

Figure 2:
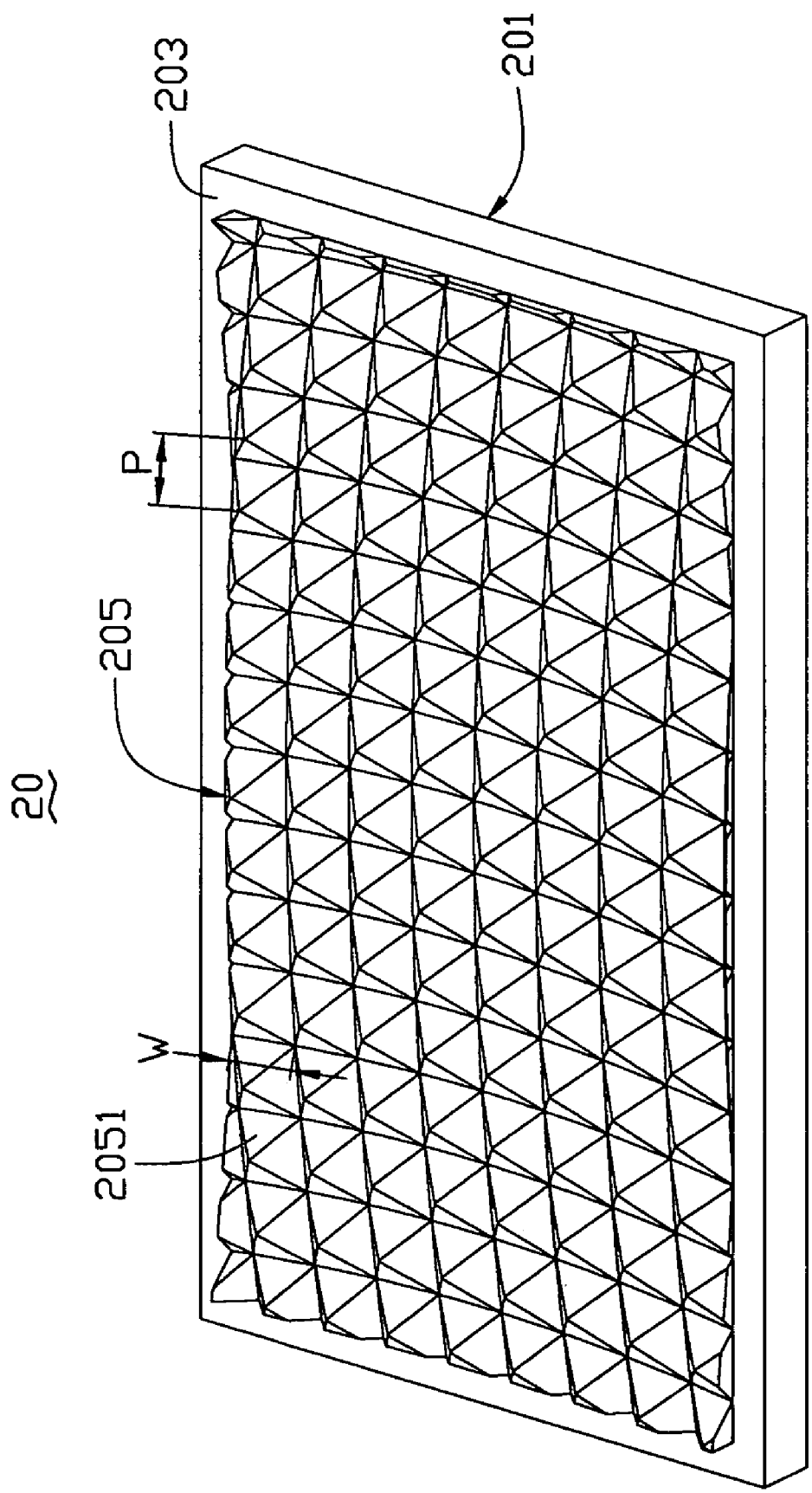
FIG. 2 is an isometric view of the prism sheet of FIG. 1.
Figure 3:
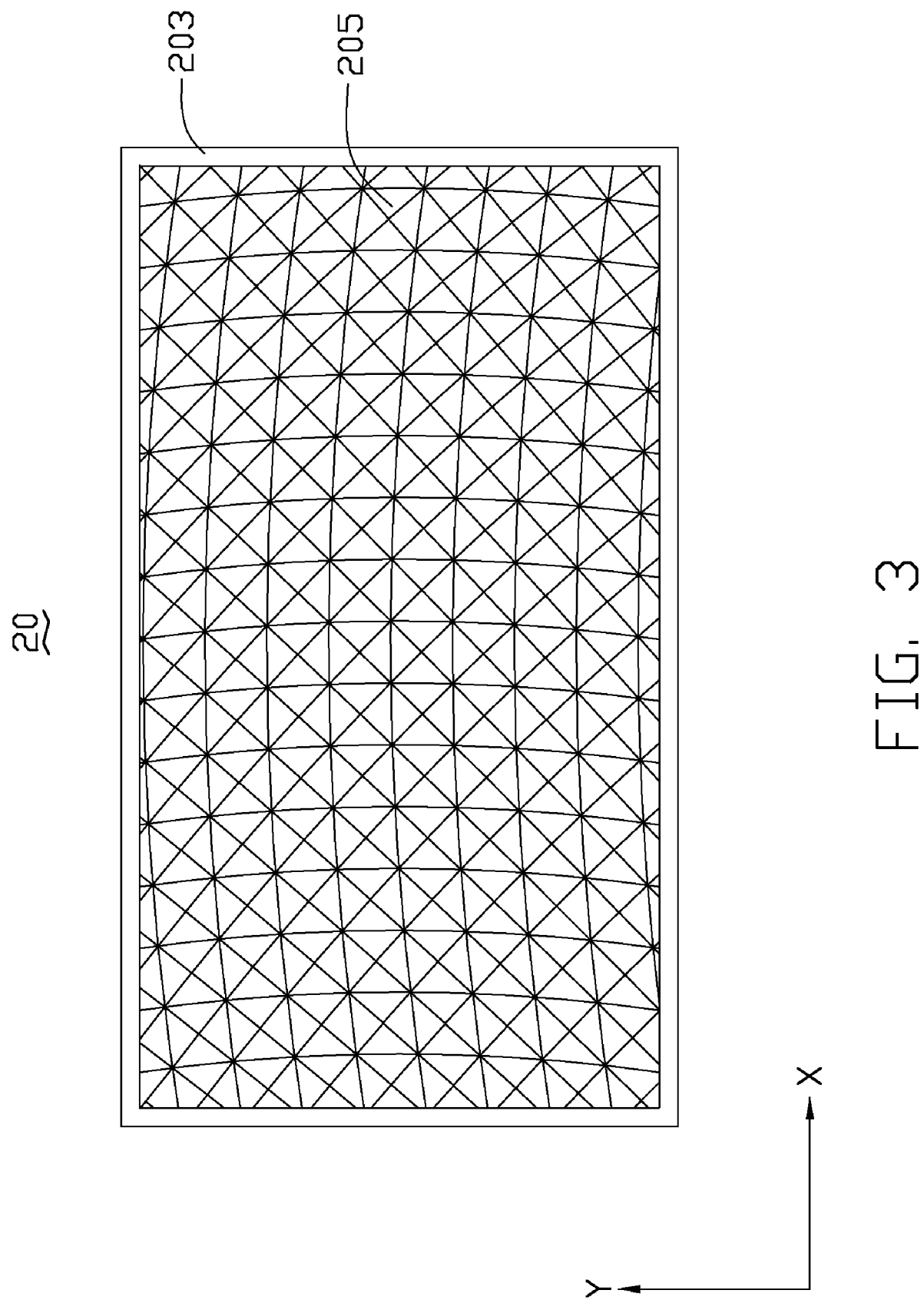
FIG. 3 is a top plan view of the prism sheet shown in FIG. 2.

Referring to FIGS. 2 and 3, the prism sheet 20 includes a light input surface 201, a light output surface 203. The light input surface 201 and the light output surface 203 are on opposite sides of the light input surface 201. A plurality of micro-protrusions 205 are formed on the light output surface 203. The light input surface 201 faces the light diffusion plate 23 and the light output surface 203 faces the liquid crystal display panel 25. The micro-protrusions 205 are arranged in a skewed matrix manner.

Each row of the micro-protrusions 205 extends along a circular arc having a same predetermined curvature. Centers of circles defined by the circular arcs are collinear. Preferably, the centers are arranged apart in a constant distance to design the micro-protrusions 205 aligned side by side. Each of the micro-protrusions 205 is formed according to the skewed matrix, thus a size, a shape, and a position of each of the micro-protrusions 205 correspond to rows and columns of the skewed matrix. That is, each micro-protrusion 205 has a shape that follows a contour of the skewed matrix. In the illustrated embodiment, the micro-protrusions 205 have a same shape and a same size. Each row and each column of the matrix is curved.

In the illustrated embodiment, each micro-protrusion 205 is substantially a square pyramidal micro-protrusion protruding from the light output surface 203. That is, each micro-protrusion 205 includes four side surfaces 2051 connected to each other. A transverse width "W" of each side surface 2051 decreases along a direction away from the light output surface 203. In addition, a pitch "P" between centers of adjacent micro-protrusions 205 is configured to be in a range from about 0.0125 millimeters to about 0.05 millimeters. A dihedral angle defined between opposite side surfaces 2051 of each micro-protrusion 205 is configured to be in a range from about 60 degrees to about 120 degrees.

The prism sheet 20 can be integrally formed by injection molding technology. A thickness of the prism sheet 20 can be in a range from about 3 millimeters to 5 millimeters. The prism sheet 20 can be made of a material selected from the group consisting of polycarbonate, polymethyl methacrylate, polystyrene, copolymer of methyl methacrylate and styrene, and any suitable combination of those.

In use, light from the lamps 22 enters the light diffusion plate 23. The light is substantially diffused in the light diffusion plate 23. Subsequently, light exiting the light output surface 240 is condensed by the micro-protrusions 205 of the prism sheet 20. As a result, a brightness of the liquid crystal display device 200 is increased. In addition, the micro-protrusions 205 are arranged in a skewed matrix on the light output surface 203. Thus moiré patterns, caused by the pixels of the liquid crystal display panel 25 and the lining/structural patterns of the micro-protrusions 205 can be kept minimal or eliminated.

Furthermore, there is no need to add an upper light diffusion film between the prism sheet 20 and the liquid crystal display panel 25. This increases an efficiency of light utilization. Moreover, when the prism sheet 20 is employed in the liquid crystal display, it can replace the conventional combination of a prism sheet and an upper light diffusion film. Thereby, an assembly process of the liquid crystal display is simplified. Moreover, the single prism sheet 20 instead of the combination of two optical sheets/films can reduce costs.

In addition, in contrast to the conventional prism sheet, the prism sheet 20 is integrally formed by injection molding technology. Injection molding allows to easier mass-produce the prism sheet 20 over the conventional method. Furthermore, because the prism lenses of the conventional prism sheet are formed by solidifying melted ultraviolet-cured transparent resin, the prism lenses of the conventional prism sheet are easily damaged and/or scratched due to poor rigidity and mechanical strength. The prism sheet 20 has a better rigidity and mechanical strength than the conventional prism sheet. Thus the prism sheet 20 has a relative high reliability.

It should be pointed out that, the interior of the housing is configured to be highly reflective.

Figure 4:
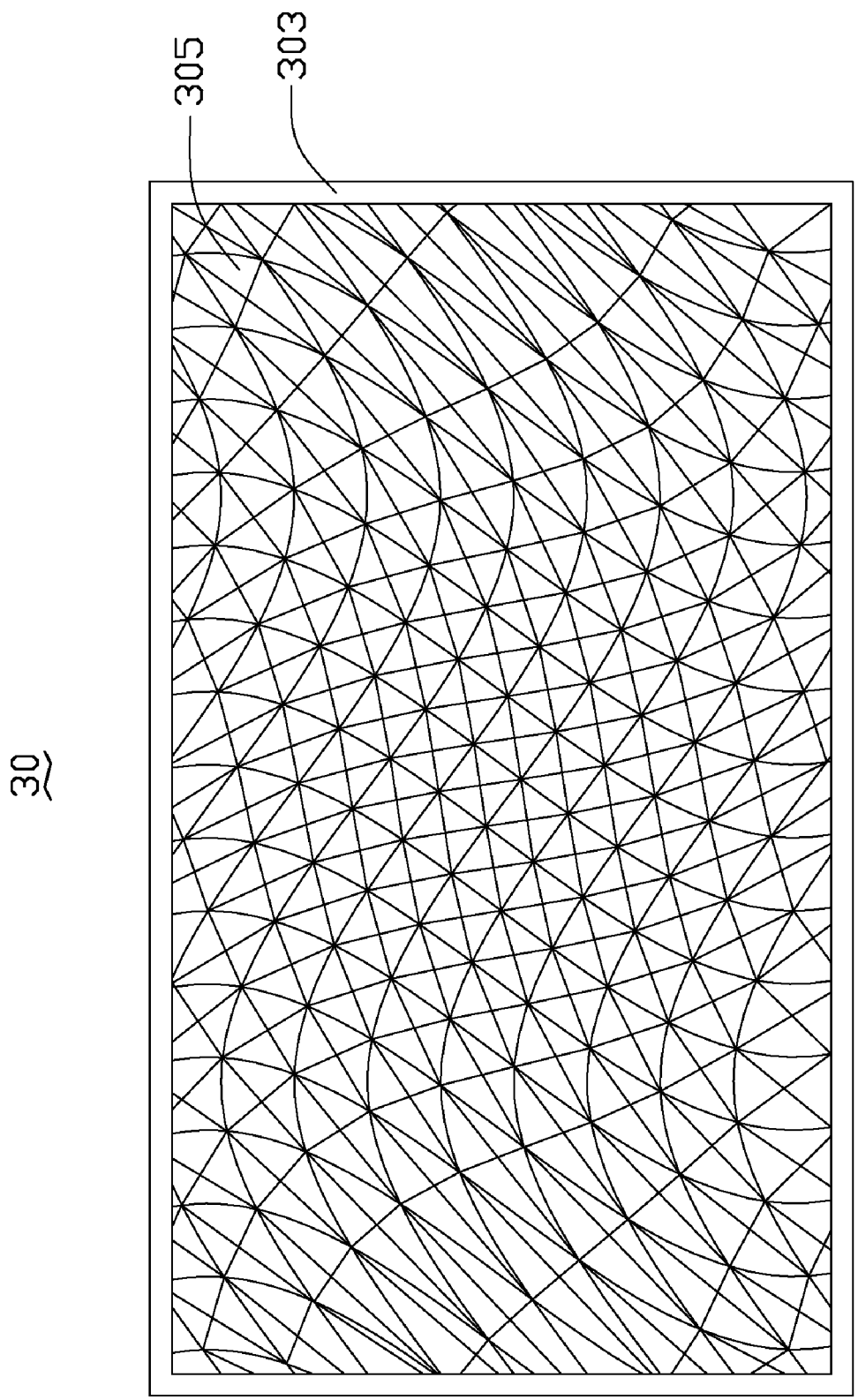
FIG. 4 is a top plan view of a prism sheet in accordance with a second embodiment of the present invention.

Referring to FIG. 4, an optical plate 30 in accordance with a second preferred embodiment is shown. The optical plate 30 is similar in principle to the optical plate 20 of the first embodiment, a plurality of micro-protrusions 305 are formed on the light output surface 303, the micro-protrusions 305 are arranged in a skewed matrix having rows and columns on the light output surface 303, however either each row or each column of the micro-protrusions 305 extends along a predetermined S-shaped curve according to the skewed matrix correspondingly. Each micro-protrusion 305 has a shape that follows a contour of the skewed matrix.

Figure 5:
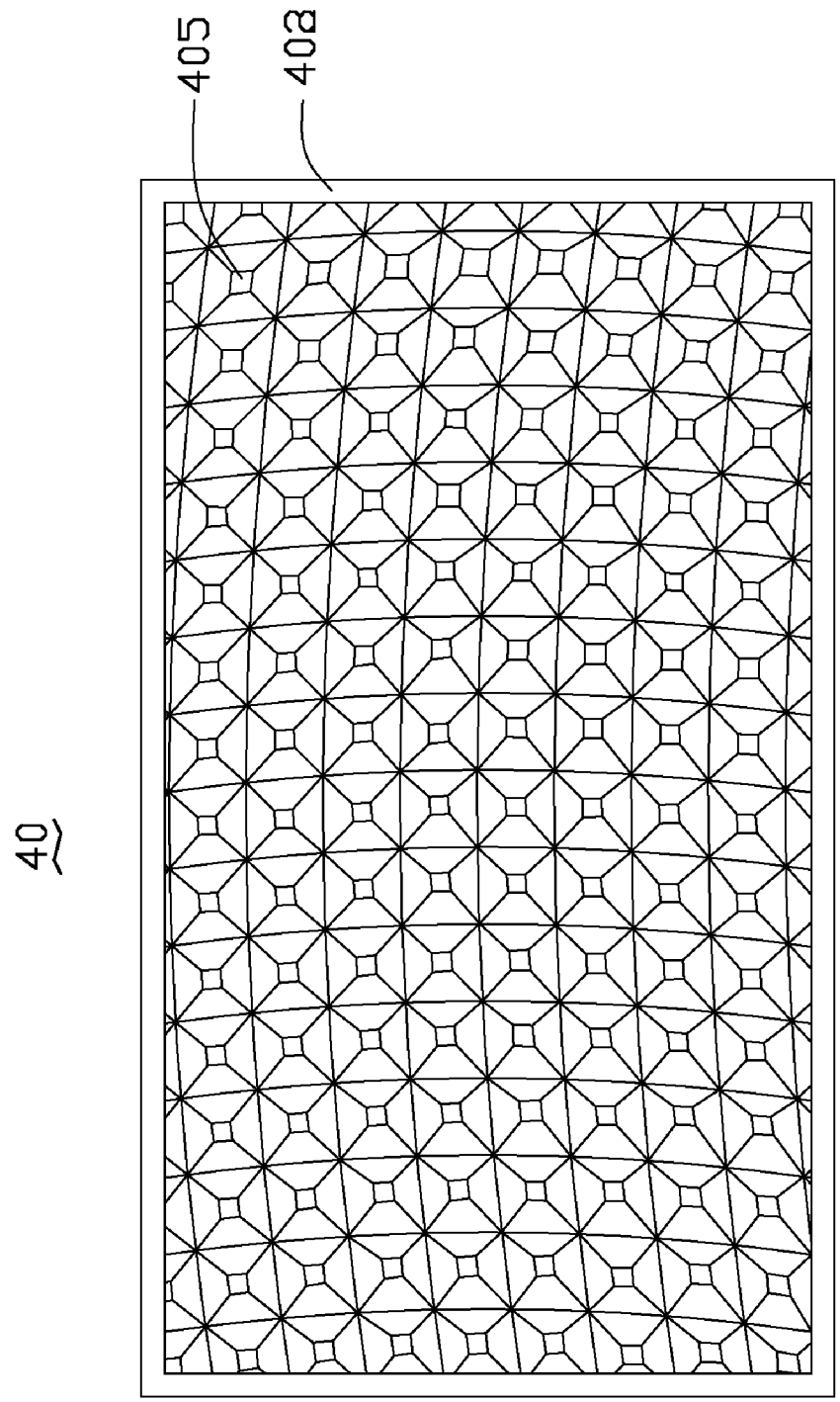
FIG. 5 is a top plan view of a prism sheet in accordance with a third embodiment of the present invention.

Referring to FIG. 5, an optical plate 40 in accordance with a third preferred embodiment is shown. A plurality of micro-protrusions 405 are formed on the light output surface 403, the micro-protrusions 405 are arranged in a skewed matrix on the light output surface 403. The optical plate 40 is similar in principle to the optical plate 20 of the first embodiment, however, each micro-protrusion 405 is a pyramidal frustum micro-protrusion.

Figure 6:
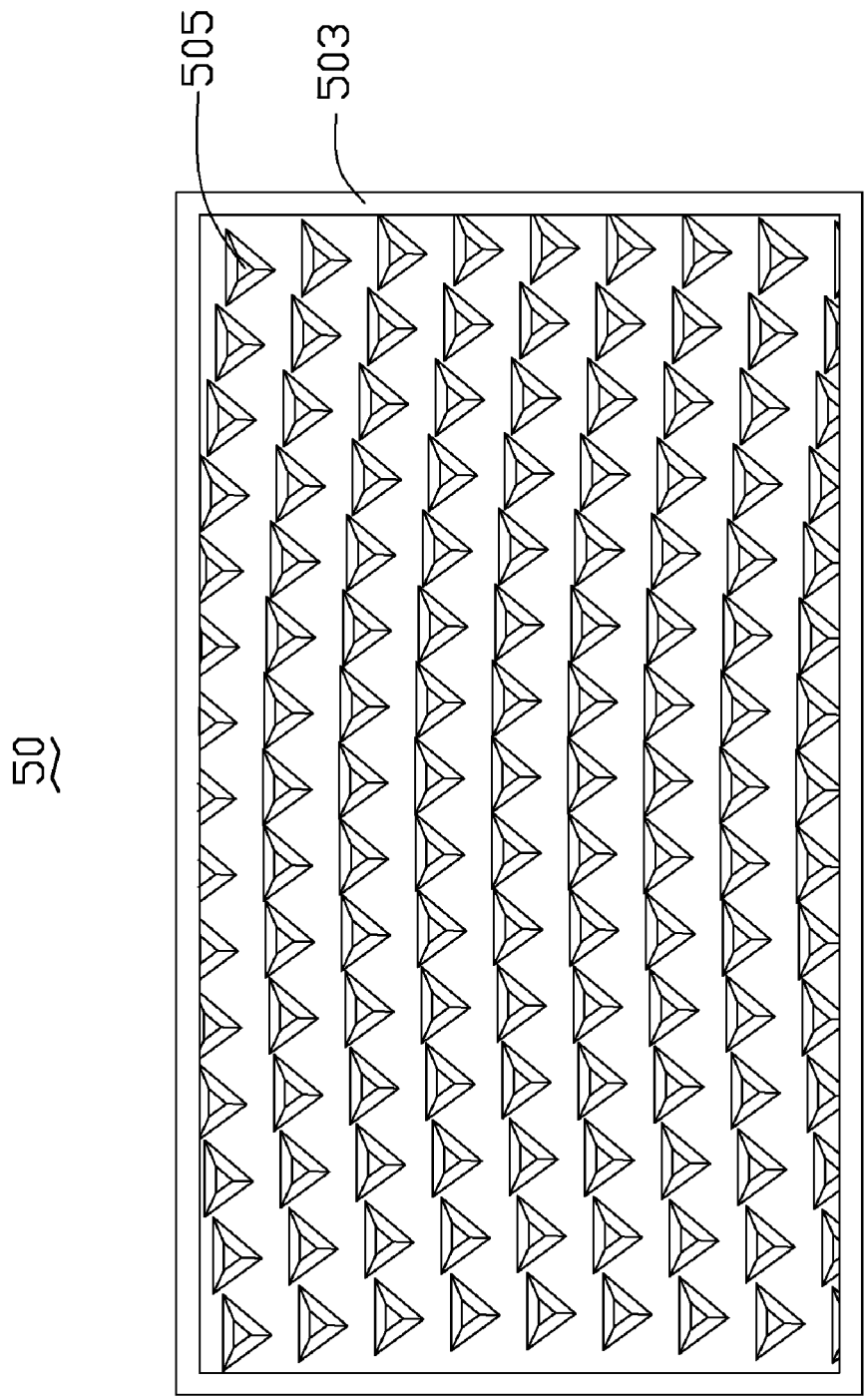
FIG. 6 is a top plan view of a prism sheet in accordance with a fourth embodiment of the present invention.
Figure 7:
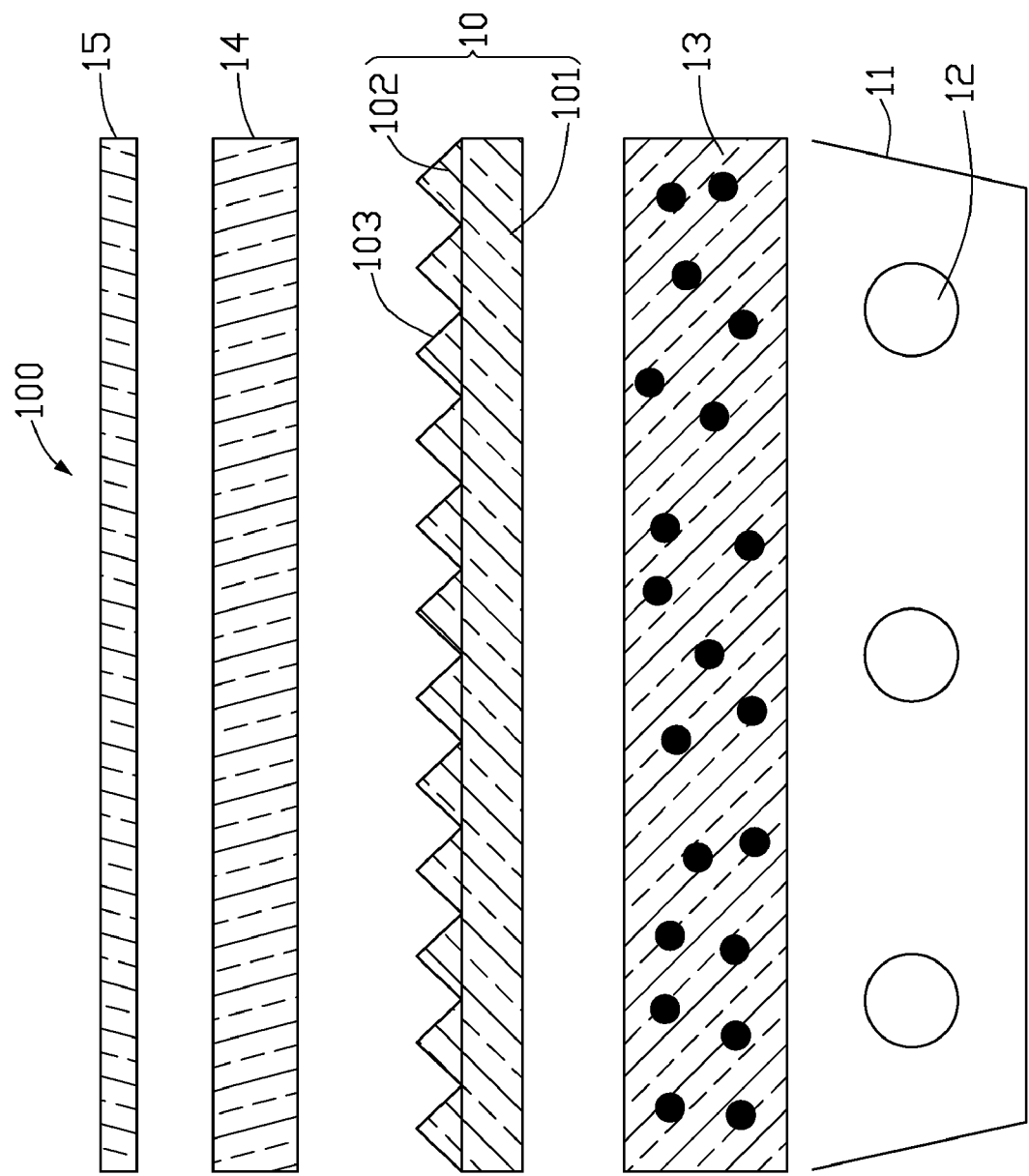
FIG. 7 is top plan view of an exploded, side cross-sectional view of a conventional liquid crystal display.
Figure 8:
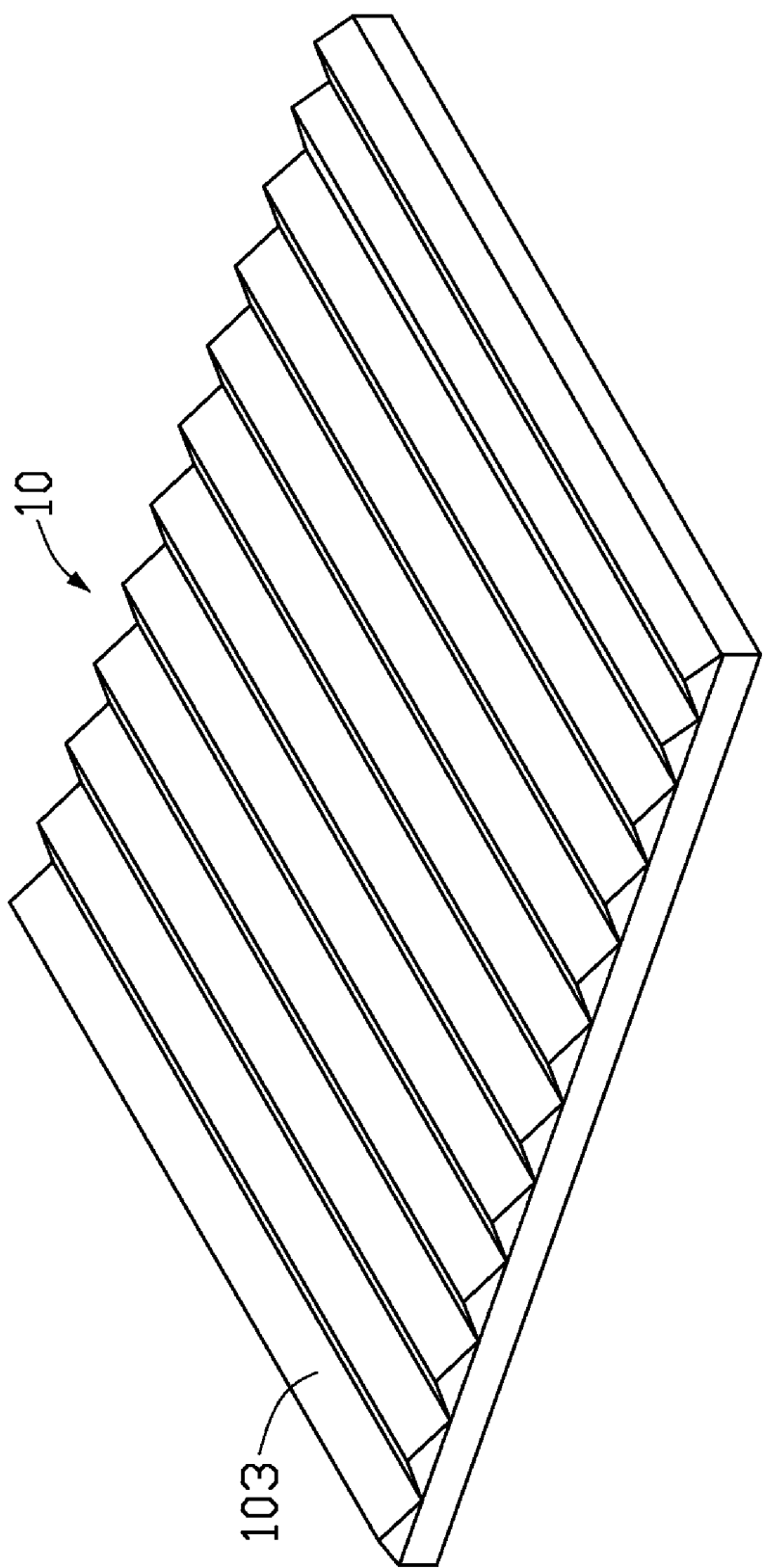
FIG. 8 is an isometric view of a prism sheet of the liquid crystal display device of FIG. 5.

Referring to FIG. 6, an optical plate 50 in accordance with a third preferred embodiment is shown. The optical plate 50 is similar in principle to the optical plate 20 of the first embodiment, a plurality of micro-protrusions 505 are formed on the light output surface 503, the micro-protrusions 505 are arranged in a skewed matrix on the light output surface 503, however each micro-protrusion 505 is a frustum of a triangular pyramidal micro-protrusion.

It can be understood that each micro-protrusion can also be a five-sided (pentagonal) pyramidal protrusion, a multi-sided (polygonal) pyramidal protrusion, or a frustum of these.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A prism sheet for a direct backlight, comprising:
   a light input surface;
   a light output surface opposite to the light input surface; and a plurality of micro-protrusions formed on the light output surface and arranged and aligned in a skewed matrix, the skewed matrix comprising rows and columns, the rows forming a plurality of first circular arcs having a predetermined S-shaped curvature, and the columns forming a plurality of second circular arcs having a predetermined S-shaped curvature, wherein each micro-protrusion includes four side surfaces connected to each other, a transverse width of each side surface decreases along a direction away from the light output surface; each micro-protrusion has a shape that follows a contour defined by the rows and columns of the skewed matrix, a pair of side surfaces of each micro-protrusion being formed along the first circular arcs and the other pair of side surfaces being formed along the second circular arcs; the first circular arcs are smooth, continuous, and coplanar with the light output surface, and the second circular arcs are smooth, continuous, and coplanar with the light output surface.

2. The prism sheet as claimed in claim 1, wherein each micro-protrusion is selected from the group consisting of pyramid and frustum of pyramid.

3. The prism sheet as claimed in claim 2, wherein each of the micro-protrusions is a square pyramidal micro-protrusion having four connecting side surfaces; a dihedral angle defined between opposite side surfaces is in a range from about 60 degrees to about 120 degrees.

4. The prism sheet as claimed in claim 1, wherein a pitch of centers of adjacent micro-protrusions is configured to be in a range from about 0.025 millimeters to about 1 millimeter.

5. The prism sheet as claimed in claim 1, wherein a material of the prism sheet is selected from the group consisting of polycarbonate, polymethyl methacrylate, polystyrene, copolymer of methylmethacrylate and styrene, and any suitable combination thereof.

6. The prism sheet as claimed in claim 1, wherein a thickness of the prism sheet is in a range from about 3 millimeters to about 5 millimeters.

7. A liquid crystal display device comprising:
at least one light source;
a light diffusion plate positioned above the at least one light source;
a prism sheet positioned above the light diffusion plate, the prism sheet comprising:
a light input surface facing the light diffusion plate;
a light output surface opposite to the light input surface; and
a plurality of micro-protrusions formed on the light output surface and arranged and aligned in a skewed matrix, the skewed matrix comprising rows and columns, the rows forming a plurality of first circular arcs having a predetermined S-shaped curvature, and the columns forming a plurality of second circular arcs having a predetermined S-shaped curvature, wherein each micro-protrusion includes four side surfaces connected to each other, a transverse width of each side surface decreases along a direction away from the light output surface; each micro-protrusion has a shape that follows a contour defined by the rows and columns of the skewed matrix, a pair of side surfaces of each micro-protrusion being formed along the first circular arc and the other pair of side surfaces being formed along the second circular arc; the first circular arcs are smooth, continuous, and coplanar with the light output surface, and the second circular arcs are smooth, continuous, and coplanar with the light output surface; and
a liquid crystal display panel positioned above the prism sheet.

8. The liquid crystal display device as claimed in claim 7, further comprising a housing, the light source being positioned in the housing.

9. The liquid crystal display device as claimed in claim 7, wherein each micro-protrusion is selected from the group consisting of pyramid and frustum of pyramid.

10. The liquid crystal display device as claimed in claim 7, wherein each of the micro-protrusions is a square pyramidal micro-protrusion having four connecting side surfaces; a dihedral angle defined between opposite side surfaces is in a range from about 60 degrees to about 120 degrees.

11. The liquid crystal display device as claimed in claim 7, wherein a pitch of centers of adjacent micro-protrusions is configured to be in a range from about 0.025 millimeters to about 1 millimeter.

12. The liquid crystal display device as claimed in claim 7, wherein a thickness of the prism sheet is in the range from about 3 millimeters to about 5 millimeters.

13. A prism sheet for a direct backlight, comprising:
a light input surface;
a light output surface opposite to the light input surface; and
a plurality of micro-protrusions formed on the light output surface and arranged and aligned in a skewed matrix, the skewed matrix comprising rows and columns, the rows forming first predetermined S-shaped curves, and the columns forming second predetermined S-shaped curves, wherein each micro-protrusion includes four side surfaces connected to each other, a transverse width of each side surface decreases along a direction away from the light output surface; each micro-protrusion has a shape that follows contours defined by the first and second predetermined S-shaped curve, a pair of side surfaces of each micro-protrusion being formed along the first predetermined S-shaped curve and the other pair of side surfaces being formed along the second predetermined S-shaped curve; the first predetermined S-shaped curves are smooth, continuous, and coplanar with the light output surface, and the second predetermined S-shaped curves are smooth, continuous, and coplanar with the light output surface.

* * * * *